(12) United States Patent
Lübbers et al.

(10) Patent No.: US 7,649,623 B2
(45) Date of Patent: Jan. 19, 2010

(54) APPARATUS FOR OPTICAL MEASUREMENT AND/OR EXAMINATION OF A WELDING ASSEMBLY

(75) Inventors: Rainer Lübbers, Paderborn (DE); Hermann Relard, Delbrück (DE); Cordt Erfling, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 232 days.

(21) Appl. No.: 11/757,704

(22) Filed: Jun. 4, 2007

(65) Prior Publication Data

US 2007/0279488 A1    Dec. 6, 2007

(30) Foreign Application Priority Data

Jun. 2, 2006    (DE) .................. 10 2006 026 265

(51) Int. Cl.
*G01N 21/00* (2006.01)
(52) U.S. Cl. .................. 356/237.1; 356/243.1
(58) Field of Classification Search ... 356/237.1–237.5, 356/243.1–243.8
See application file for complete search history.

(56) References Cited

U.S. PATENT DOCUMENTS

| | | | | |
|---|---|---|---|---|
| 4,700,045 A | * | 10/1987 | Merry et al. ........... | 219/121.78 |
| 5,083,073 A | * | 1/1992 | Kato ..................... | 318/577 |
| 5,363,185 A | * | 11/1994 | Zana ..................... | 356/2 |
| 5,705,812 A | * | 1/1998 | Brewer et al. .......... | 250/264 |
| 2001/0022034 A1 | * | 9/2001 | Krenkel et al. ......... | 33/702 |
| 2006/0119830 A1 | * | 6/2006 | Ottens et al. ............ | 355/77 |
| 2007/0154062 A1 | * | 7/2007 | Relard et al. ........... | 382/100 |

FOREIGN PATENT DOCUMENTS

| | | |
|---|---|---|
| DE | 39 41 144 A1 | 6/1991 |
| DE | 103 11 247 A1 | 9/2004 |
| EP | 1 091 186 A2 | 4/2001 |
| WO | WO 03/044458 | 5/2003 |
| WO | WO 03/076874 | 9/2003 |

\* cited by examiner

*Primary Examiner*—Hoa Q Pham
(74) *Attorney, Agent, or Firm*—Henry M. Feiereisen; Ursula B. Day

(57) ABSTRACT

Apparatus for optical measurement and/or examination of a welding assembly includes a measuring space in which a welding assembly is located. Further disposed in the measuring space is a stationary reference object which is made of a material having a coefficient of thermal expansion $\alpha \leq 2.0 \ast 10^{-6}/K$ at 20° C. A plurality of cameras in the measuring space take images of the welding assembly and the reference object, with the image information transmitted to an evaluation device for evaluation.

13 Claims, 1 Drawing Sheet

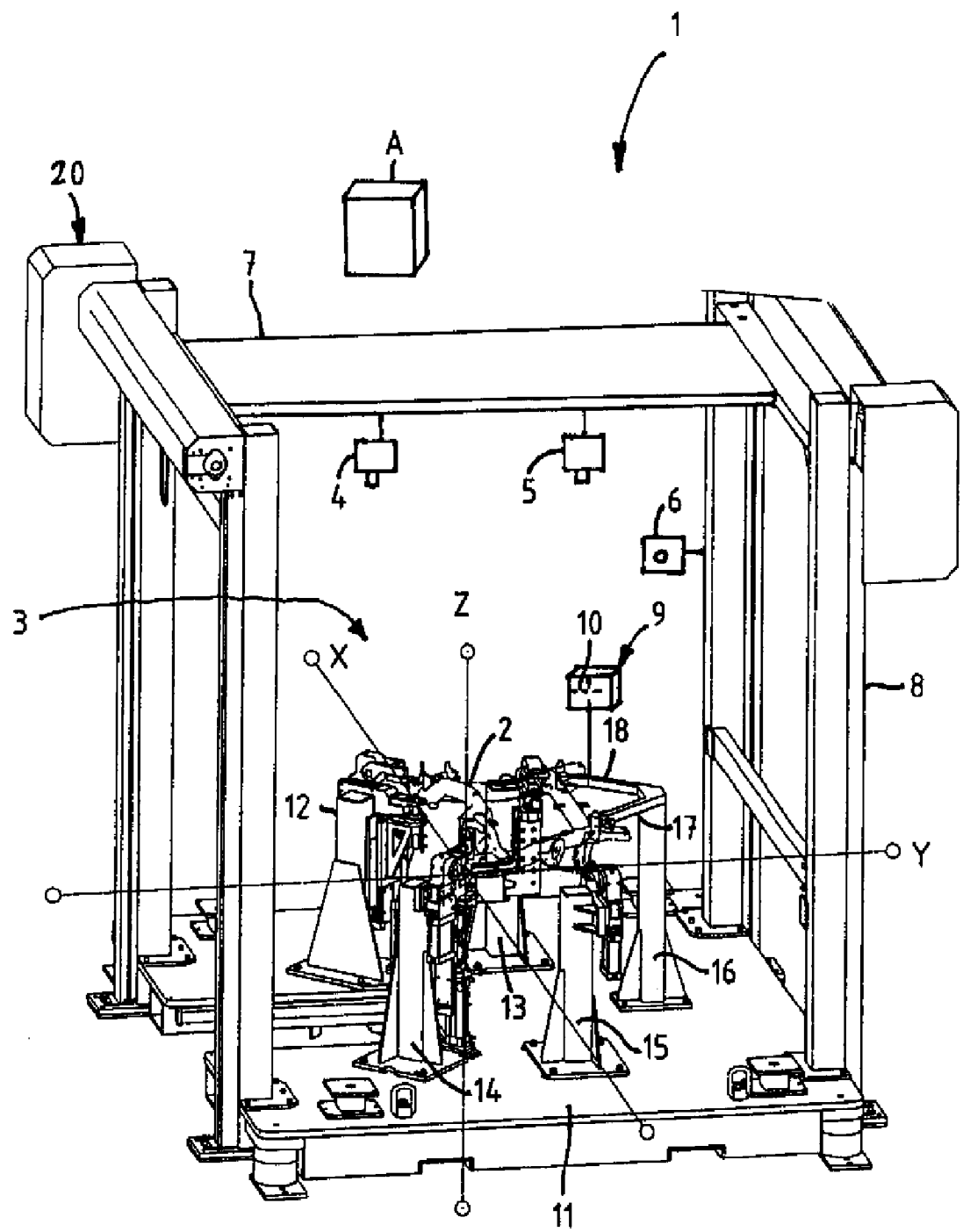

APPARATUS FOR OPTICAL MEASUREMENT AND/OR EXAMINATION OF A WELDING ASSEMBLY

CROSS-REFERENCES TO RELATED APPLICATIONS

This application claims the priority of German Patent Application, Serial No. 10 2006 026 265.4, filed Jun. 2, 2006, pursuant to 35 U.S.C. 119(a)-(d), the content of which is incorporated herein by reference in its entirety as if fully set forth herein.

BACKGROUND OF THE INVENTION

The present invention relates to an apparatus for optical measurement and/or examination of a welding assembly, such as a motor vehicle axle or an instrument panel.

Nothing in the following discussion of the state of the art is to be construed as an admission of prior art.

Heretofore, the dimensional precision of welding assemblies, e.g. motor vehicle axles or instrument panels, produced on a large scale has been checked through attribute testing or measurement. Attribute testing involves the use of mechanical tracing gauges. This procedure is time consuming, inflexible, generally inaccurate, and prone to fail. Also known are photogrammetric processes for measuring an item which is arranged in a measuring space and recorded by cameras disposed in various positions. Through combining the image information from the individual cameras, the item can be measured in the three-dimensional space. A drawback of this procedure is the need for each camera to be calibrated onto the item prior to each measurement. This is time-consuming and results inaccurate measurements.

It would therefore be desirable and advantageous to provide an improved apparatus for optical measurement and/or examination of a welding assembly to obviate prior art shortcomings.

SUMMARY OF THE INVENTION

According to one aspect of the present invention, an apparatus for optical measurement and/or examination of a welding assembly includes a measuring space in which a welding assembly is located, a stationary reference object fixedly disposed in the measuring space and made of a material having a coefficient of thermal expansion $\alpha \leq 2.0 \ast 10^{-6}/K$ at 20° C., a plurality of cameras arranged in the measuring space for taking images of the welding assembly and the reference object, and an evaluation device for receiving image information transmitted by the cameras for evaluation.

The present invention resolves prior art problems by fixedly securing in the measuring space a reference object of very low coefficient of thermal expansion. At each measurement of the welding assembly, the reference object is measured at the same time. This reference measurement can then be used during the actual measurement for determination of corrective values which are used by the evaluation unit to correct through computation the images transmitted by the cameras, e.g. by shifting single image dots. As a result, the apparatus is calibrated.

The use of a particular material with extremely low thermal expansion ensures that the position and the expansion of the reference object does not change, thus further enhancing the quality of the measuring result.

According to another feature of the present invention, a sensor carrier may be provided for attachment of at least one of the cameras. In photogrammetric measurement, the measuring result is dependent on the disposition of the cameras. Placing one or more cameras on a sensor carrier secures the cameras in place so that their relative position can no longer change. Suitably, the sensor carrier is made of a material having a coefficient of thermal expansion $\alpha \leq 2.0 \ast 10^{-6}/K$ at 20° C. Therefore, the position of the cameras cannot change as a result of temperature fluctuations. Currently preferred is a configuration of a plate-shaped sensor carrier because in this way, the attachment of the cameras can be easily implemented.

According to another feature of the present invention, a support frame may be provided in surrounding relationship to the measuring space for attachment of the sensor carrier. As a result, the support frame allows the disposition of the sensor carrier in the measuring space above the item being measured. It is also conceivable, to secure at least one of the cameras to a support frame which is disposed in surrounding relationship to the measuring space. As a result, a camera can also be arranged in the measuring space, when the attachment of the camera upon the sensor carrier becomes impossible or unsuitable. The support frame may be made of a material having a coefficient of thermal expansion $\alpha \leq 2.0 \ast 10^{-6}/K$ at 20° C. As a consequence, the measuring results are even less impacted by temperature fluctuations.

According to another feature of the present invention, the reference object, sensor carrier, and/or support frame may be made of carbon fiber reinforced plastic (CFRP). Carbon fiber reinforced plastic has in length direction of the carbon fibers a coefficient of thermal expansion of $0.1 \ast 10^{-6}/K$ at 20° C. Other examples of suitable material for the reference object, sensor carrier, and/or support frame include glass fiber reinforced plastic (GRP), carbon, or Invar steel. All these materials are characterized by a very low coefficient of thermal expansion.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE is a perspective illustration of an apparatus for optical measurement and/or examination of a welding assembly in accordance with the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to the FIGURE, there is shown a perspective illustration of an apparatus according to the present invention, generally designated by reference numeral 1, for optical measurement and/or examination of a welding assembly 2, such as a motor vehicle axle or an instrument panel. Reference characters X, Y, Z designate the space coordinates in the FIGURE.

The apparatus 1 includes a measuring space 3 which accommodates cameras 4, 5, 6 for taking images of the welding assembly 2. The cameras 4, 5 are hereby secured onto a sensor carrier 7 which spans the measuring space 3 and has a plate-shaped configuration. The sensor carrier 7 is attached to a support frame 8 which surrounds the measuring space 3. Both, the sensor carrier 7 and the support frame 8 are made of carbon fiber reinforced plastic (CFRP) with a coefficient of thermal expansion $\alpha$ equal or smaller ($\leqq$) than $2.0*10^{-6}$/K at 20° C.

As shown in the FIGURE, a reference object 9 is securely fixed in place within the measuring space 3. The reference object 9 is shaped in the form of a block and has a surface which is provided all-round with reference markings 10 in the form of grid lines. The reference object 9 is also made of carbon fiber reinforced plastic (CFRP) with a coefficient of thermal expansion $\alpha$ equal or smaller ($\leqq$) than $2.0*10^{-6}$/K at 20° C. The individual layers of the carbon fiber reinforced plastic are arranged in the reference object 9 in such a way that the thermal expansion is equally low in all dimensions of the reference object 9.

The cameras 4, 5, 6 are connected to an evaluation device A which executes a synthesis of the image information transmitted by the cameras 4, 5, 6 to acquire three-dimensional object data of the item being measured, i.e. welding assembly 2.

The measuring space 3 is located within a housing 20 which is only hinted here and light-proof. In addition, the measuring space 3 is equipped with an excess pressure ventilation to prevent ingress of contaminants into the measuring space 3.

The measuring space 3 includes a stable base plate 11 for support of four support columns 12, 13, 14, 15, and a position column 16. Two columns 12, 14 are height-adjustable. The position column 16 has an upper end which is formed with two arms 17, 18. Each arm 17, 18 has a pin, with pins of the arms 17, 18 intended for engagement in complementary openings of the welding assembly 2. In this way, the welding assembly 2 can be positioned at a defined disposition before the start of the measurement.

A feature of the welding assembly 2 is directly measured by taking several images of the feature with the assistance of the cameras 4, 5, 6 and subsequent evaluation of the image information in the evaluation device A. The cameras 4, 5, 6 ascertain at each measurement also the position and the reference markings 10 of the stationary reference object 9, and this image information is then used to calibrate the apparatus 1. As a consequence, the quality of the measuring result is significantly improved. An even further enhancement of the measuring quality is realized by making the reference object 9 of carbon fiber reinforced plastic with a coefficient of thermal expansion $\alpha$ equal or smaller ($\leqq$) than $2.0*10^{-6}$/K at 20° C.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. Apparatus for optical measurement and/or examination of a welding assembly, comprising:
   a measuring space in which a welding assembly is located;
   a stationary reference object fixedly disposed in the measuring space and made of a material having a coefficient of thermal expansion $\alpha \leqq 2.0*10^{-6}$/K at 20° C.;
   a plurality of cameras arranged in the measuring space for taking images of the welding assembly and the reference object;
   an evaluation device for receiving image information transmitted by the cameras for evaluation; and
   a sensor carrier, made of a material having a coefficient of thermal expansion $\alpha \leqq 2.0*10^{-6}$/K at 20° C., for attachment of at least two of the cameras.

2. The apparatus of claim 1, wherein the sensor carrier has a plate-shaped configuration.

3. The apparatus of claim 1, further comprising a support frame disposed in surrounding relationship to the measuring space.

4. The apparatus of claim 3, further comprising a sensor carrier for attachment of at least one of the cameras, wherein the sensor carrier is secured to the support frame.

5. The apparatus of claim 4, wherein at least one member selected from the group consisting of reference object, sensor carrier, and support frame, is made of carbon fiber reinforced plastic (CFRP).

6. The apparatus of claim 4, wherein at least one member selected from the group consisting of reference object, sensor carrier, and support frame, is made of glass fiber reinforced plastic (GRP).

7. The apparatus of claim 4, wherein at least one member selected from the group consisting of reference object, sensor carrier, and support frame, is made of carbon.

8. The apparatus of claim 4, wherein at least one member selected from the group consisting of reference object, sensor carrier, and support frame, is made of Invar steel.

9. The apparatus of claim 3, wherein at least one of the cameras is secured to the support frame.

10. The apparatus of claim 3, wherein the support frame is made of a material having a coefficient of thermal expansion $\alpha \leqq 2.0*10^{-6}$/K at 20° C.

11. The apparatus of claim 1, wherein the welding assembly is a motor vehicle axle or instrument panel.

12. The apparatus of claim 1, wherein the reference object is shaped in the form of a block.

13. The apparatus of claim 1, wherein the reference object is shaped in the form of a block and has an outer surface which is provided with reference markings in the form of grid lines.

* * * * *